(12) United States Patent
Temel et al.

(10) Patent No.: US 9,718,982 B2
(45) Date of Patent: Aug. 1, 2017

(54) PASTE RESIN

(71) Applicant: Allnex Austria GmbH, Werndorf (AT)

(72) Inventors: Armin Temel, Graz (AT); Thomas Schonbacher, Kalsdorf (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 16 days.

(21) Appl. No.: 14/759,671

(22) PCT Filed: Jan. 8, 2014

(86) PCT No.: PCT/EP2014/050251
§ 371 (c)(1),
(2) Date: Jul. 8, 2015

(87) PCT Pub. No.: WO2014/108450
PCT Pub. Date: Jul. 17, 2014

(65) Prior Publication Data
US 2015/0344720 A1 Dec. 3, 2015

(30) Foreign Application Priority Data

Jan. 9, 2013 (EP) .................................. 13150599

(51) Int. Cl.
| | | |
|---|---|---|
| *C08L 33/02* | (2006.01) | |
| *C09D 17/00* | (2006.01) | |
| *C09D 133/02* | (2006.01) | |
| *C09D 133/14* | (2006.01) | |
| *C08F 220/06* | (2006.01) | |
| *C08F 220/34* | (2006.01) | |
| *C08L 33/14* | (2006.01) | |

(52) U.S. Cl.
CPC .......... *C09D 133/02* (2013.01); *C08F 220/06* (2013.01); *C08F 220/34* (2013.01); *C08L 33/02* (2013.01); *C08L 33/14* (2013.01)

(58) Field of Classification Search
CPC .... C09D 133/02; C09D 17/00; C09D 129/10; C08L 2205/02; C08L 33/14; C08L 33/02

USPC ...................................... 525/217, 221, 218
See application file for complete search history.

(56) References Cited

U.S. PATENT DOCUMENTS

| 3,222,418 A | 12/1965 | Murdock |
| 2005/0159555 A1* | 7/2005 | Shimanaka ............... C08F 8/44 525/276 |
| 2011/0028636 A1 | 2/2011 | Hobisch et al. |

FOREIGN PATENT DOCUMENTS

| EP | 0 311 209 | 4/1989 |
| EP | 2 110 410 | 10/2009 |
| JP | 56061450 A * | 5/1981 |
| JP | 2001002736 A * | 1/2001 |
| JP | 2008056786 A * | 3/2008 |
| WO | 2009/127668 | 10/2009 |

OTHER PUBLICATIONS

Derwent Abstract of JP 56-061450 (Acc. No. 1981-50825D, 1986, 2 pages).*
Machine translated English language equivalent of JP 2001-002736 (2001, 10 pages).*
CAPlus Abstract of JP 2001-002736 (AN 2001:17870, 3 pages).*
Machine translated English language equivalent of JP 2008-056786 (2008, 20 pages).*
Google translation of paragraph 8 of JP 56061450 (2016, 1 page).*
Human translation of JP 56-064450 (1981, 21 pages).*
Human translation of 2001-002736 (2001, 42 pages).*
International Search Report issued Mar. 20, 2014 in International Application No. PCT/EP2014/050251.

* cited by examiner

*Primary Examiner* — Brieann R Fink
(74) *Attorney, Agent, or Firm* — Wenderoth, Lind & Ponack, L.L.P.

(57) ABSTRACT

The invention relates to a paste resin A which is a mixture of at least two acrylic copolymer resins A, wherein the acrylic copolymer resin A1 comprises at least one basic acrylic comonomer, and the acrylic copolymer resin A2 comprises at least one acidic acrylic comonomer, and a method of use thereof for formulating both water-borne and solvent-borne tinted paints with a wide variety of pigments.

13 Claims, No Drawings

PASTE RESIN

FIELD OF THE INVENTION

The present invention relates to a paste resin which can be used to prepare pigment paste compositions for tinting of coloured paints.

BACKGROUND OF THE INVENTION

In the paint industry, stock control and logistics are rationalized by using colour mixing systems. In such systems, a paint colour selected for a customer is produced by selecting a base paint from a range of available base paints and adding to the selected base paint one or more pigment pastes which are intimate mixtures of one or more pigments with paste resins which latter having good dispersing properties. Such systems have been widely used in the field of decorative coatings, as disclosed, e.g., in EP 0 311 209 A1.

Examples of pigment pastes for paint tinting systems are disclosed, i.a. in EP 2 297 246 B1. In addition to at least one pigment, pigment pastes typically include special resins, solvents, and usually also additives. Pigments for various colours vary considerably in chemical nature, from simple inorganic elements such as carbon in the form of channel black or lamp black, to inorganic oxides (such as iron oxides), copper, cobalt, chromium and lead based pigments, and organic pigments (such as azo pigments, phthalocyanine pigments, and polycyclic aromatic pigments such as pigments derived from perylene, anthraquinone and quinacridone). For each pigment, a resin compatible therewith needs to be used for the preparation of a pigment paste. This resin needs, in turn, to be compatible with the binder system of the base paints and with the resins used in other pigment pastes as well, since for many colours, the addition of more than one pigment paste is required. The resin should also be able to disperse a sufficient amount of the pigment. It is a further requirement that tinting systems should be compatible with both solvent borne paints and water borne paints, and also, with the usual range of binder resins. The favourable properties of paints should also not be impaired by addition of the pigment paste, particularly with regard to the aspect of painted surfaces.

SUMMARY OF THE INVENTION

The object of the invention is therefore to provide a pigment paste comprising a resin ("paste resin") which is compatible with most types of pigments, as well as most binder resins, be they solvent-borne or water-borne. The paste resin should have sufficient dispersing and wetting power to disperse various pigments based on different raw materials such as those mentioned supra. It is of foremost importance that addition of the pigment paste does not lead to deterioration of the quality of the coating film imparted by the binder resin, particularly colour stability and gloss level.

This object has been achieved by providing a paste resin A which is a mixture of at least two acrylic copolymer resins, A1 and A2, wherein the acrylic copolymer resin A1 comprises at least one basic comonomer, and the acrylic copolymer resin A2 comprises at least one acidic comonomer.

DETAILED DESCRIPTION OF THE PREFERRED EMBODIMENTS

The first acrylic copolymer resin A1 which is a basic acrylic copolymer resin made by copolymerisation of at least three classes of vinylic monomers having each at least one copolymerisable olefinic unsaturation. It comprises, as one class, at least one amino group-containing vinyl type monomer A11 which preferably has at least one amino group which is particularly preferably a tertiary amino group. Particularly useful amino-functional vinyl monomers are esters of tertiary aminoalcohols with acrylic or methacrylic acid, such as dimethyl aminoethyl(meth)acrylate, dimethyl aminopropyl(meth)acrylate, and amides of monotertiary monoprimary diamines such as dimethylaminoethyl(meth) acrylamide, 3-N,N-dimethylaminopropyl(meth)acrylamide, and the corresponding diethylamino compounds. As a further class of monomers, vinylic monomers A12 are used to make the copolymer which are linear or branched alkyl (meth)acrylates having from 1 to 13 carbon atoms in the alkyl group, such methyl(meth)acrylate, ethyl(meth)acrylate, n-butyl(meth)acrylate, isobutyl(meth)acrylate and 2-ethylhexyl(meth)acrylate. In a preferred embodiment, at least two different monomers A12 are used together. Further vinylic monomers present in the polymerisation reaction leading to the basic acrylic copolymer A1 are hydrophilic vinyl monomers A13 as a further class of monomers, having a moiety derived from polyethylene glycol or a mixed ether of ethylene and propylene glycol having a mass fraction of at least 60% of oxyethylene groups in the total mass of oxyalkylene groups, the polyether fragment having a molar mass of preferably from 200 g/mol to 5000 g/mol, particularly preferably from 500 g/mol to 1500 g/mol, where one of the hydroxyl groups of the polyetherglycol is converted to an ether group, preferably a methyl, ethyl or butyl ether group, and the other hydroxyl group is consumed by esterification with (meth)acrylic acid or other olefinically unsaturated monocarboxylic acids, or by etherification with an olefinically unsaturated alcohol such as allyl or methallyl alcohols, or by urethane formation via reaction with an adduct of a hydroxyalkyl(meth)acrylate and a diisocyanate. It is particularly preferred to use monomers A13 which are adducts of hydroxyethyl(meth)acrylate, an aromatic isocyanate such as toluylene diisocyanate or bis-(4-isocyanatophenyl)methane, and a polyethylene glycol of a molar mass from 200 g/mol to 5000 g/mol, esters of the said polyethylene glycol with (meth)acrylic acid, and ethers of the said polyethylene glycol with (meth)allyl alcohol. Mixtures of two or more monomers A3 can also be used.

The mass fractions of the three classes of vinyl monomers A11, A12 and A13 in the monomers used to make the copolymer A1 are preferably from 15% to 40%, from 15% to 45%, and from 30% to 60%, respectively, particularly preferably from 20% to 35%, from 20% to 40%, and from 35% to 55%, respectively, and especially preferably from 25% to 30%, from 25% to 35%, and from 40% to 50%, respectively. These mass fractions are calculated as the ratio of the mass of monomers of one class, and the sum of the masses of all monomers used to make the copolymer A1. Polymerisation is conducted as customary in solution, using alcohols such as isopropanol, or esters such as butyl acetate as solvents, and azo or peroxo catalysts such as azobisisobutyronitrile, tert.-amyl peroctoate or tert.-amyl peroxide as initiators.

It is further preferred to use monomers A11 that are derived from methacrylic acid. It is also preferred to use monomers A12 that are derived from acrylic acid. In a further preferred embodiment, a basic acrylic copolymer A1 is used where a mass fraction of at least 80%, preferably at least 90%, and most preferred, all monomers A11, are derived from methacrylic acid, and a mass fraction of at least 80%, preferably at least 90%, and most preferred, all monomers A12, are derived from acrylic acid. A preferred embodiment is the combination of the individual preferred embodiments mentioned supra.

It is also possible to copolymerise with the monomers A11 to A13 any further monomers A14 which are also of the vinyl type, i.e. they also have at least one copolymerisable olefinically unsaturated group in their molecules. These vinyl monomers A14 may also be used as mixtures of two or more of these monomers A14. Such monomers are preferably styrene, any of the isomers of alkyl styrenes, particularly methyl styrenes ("vinyl toluene"), vinyl naphthalene, alkyl esters of olefinically unsaturated carboxylic acids, dialkyl esters of olefinically unsaturated dicarboxylic acids, hydroxyalkyl esters of olefinically unsaturated carboxylic acids such as hydroxyethyl(meth)acrylate, hydroxyalkyl esters of olefinically unsaturated dicarboxylic acids such as the mono-hydroxyethyl ester of maleic acid (CAS No. 26560-94-1) or the mixed butyl-hydroxyethyl ester of maleic acid (CAS No. 26469-34-1), unsaturated amides and nitriles derived from such acids, such as acrylamide, and N,N-dimethylacrylamide, alkyl vinyl ethers such as n-butyl vinyl ether, and alkyl vinyl ketones such as ethyl vinyl ketone. Acidic vinyl type monomers, such as acrylic or methacrylic acids, are, of course, less preferred as monomers A14.

The acidic acrylic copolymer resin A2 is a copolymer of at least two classes of vinylic monomers having each at least one copolymerisable olefinic unsaturation. It comprises, as the first class, at least one olefinically unsaturated monomer A21 that has acid functional groups in addition to at least one copolymerisable olefinic unsaturation, and as the second class, at least one olefinically unsaturated monomer A22 selected from the group consisting of linear or branched alkyl(meth)acrylates having from 1 to 13 carbon atoms in the alkyl group, such methyl(meth)acrylate, ethyl(meth) acrylate, n-butyl(meth)acrylate, isobutyl(meth)acrylate and 2-ethylhexyl(meth)acrylate. In a preferred embodiment, at least two different monomers A22 are used together.

A further class of vinyl monomers A23 may be copolymerised with monomer A21 and optionally, also monomer A22, which vinyl monomers A23 may be selected from the group consisting of styrene, any of the isomers of alkyl styrenes, particularly methyl styrenes ("vinyl toluene"), vinyl naphthalene, alkyl esters of olefinically unsaturated carboxylic acids, dialkyl esters of olefinically unsaturated dicarboxylic acids, hydroxyalkyl esters of olefinically unsaturated carboxylic acids such as hydroxyethyl(meth) acrylate, hydroxyalkyl esters of olefinically unsaturated dicarboxylic acids such as the mono-hydroxyethyl ester of maleic acid (CAS No. 26560-94-1) or the mixed butyl-hydroxyethyl ester of maleic acid (CAS No. 26469-34-1), unsaturated nitriles derived from such acids, such as acrylontrile, alkyl vinyl ethers such as n-butyl vinyl ether, and alkyl vinyl ketones such as ethyl vinyl ketone.

It has been found that the acid value of the acidic acrylic copolymer A2 is preferably in a range of from 20 mg/g to 800 mg/g, more preferably from 50 mg/g to 700 mg/g, and particularly preferred, from 100 mg/g to 600 mg/g. Its weight-average molar mass $M_w$ lies preferably within a range of from 2 kg/mol to 50 kg/mol, more preferably between 3 kg/mol and 40 kg/mol, and particularly preferred, from 4 kg/mol to 25 kg/mol, as measured by gel permeation chromatography using polystyrene standards.

Preferred olefinically unsaturated monomers A21 are olefinically unsaturated carboxylic acids such acrylic acid, methacrylic acid, ethacrylic acid, vinyl acetic acid, crotonic and isocrotonic acids, as well as half esters of olefinically unsaturated dicarboxylic acids such as monomethyl maleinate. It is also possible to use vinyl sulfonic acid or vinyl phosphonic acid, alone, in combination with each other, or with one or more of the olefinically unsaturated carboxylic acids mentioned supra. Particularly preferred are acrylic and methacrylic acids.

In a preferred embodiment, olefinically unsaturated monomers A21 are used that have at least one hydrogen atom on each of the carbon atoms forming the olefinically unsaturated bond, e.g., acrylic acid, crotonic and isocrotonic acids, and vinyl acetic acid. It is also preferred to use olefinically unsaturated monomers A22 that are derived from methacrylic acid. In a further preferred embodiment, an acrylic copolymer A2 is used where a mass fraction of at least 80%, preferably at least 90%, and most preferred, all monomers A21, have at least one hydrogen atom on each of the carbon atoms forming the olefinically unsaturated bond, and a mass fraction of at least 80%, preferably at least 90%, and most preferred, all monomers A22 are derived from methacrylic acid.

For the preparation of the paste resin A, the acrylic copolymers A1 and A2 are mixed in a mass ratio of from 70% to 97% of A1, and from 30% to 3% of A2, preferably from 75% to 95% of A1, and from 25% to 5% of A2, particularly preferably from 85% to 93% of A1, and from 15% to 7% of A2.

In a preferred embodiment, a mixture is first made of the basic acrylic copolymer A1, water and an acid for at least partial neutralisation, to provide a solution of the at least partially neutralised resin A1 in water. In a separate step, the acidic copolymer A2 is at least partially neutralised with a basic neutralisation agent, and then added to the solution of the at least partially neutralised resin A1 in water.

"At least partially neutralised" as used in this application means that a neutralisation agent N having an amount of substance $n_N$ of functional base or acid groups (a base to neutralize an acid, or an acid to neutralize a base) is added to a substance S to be neutralised which is either an acid or a base, having an amount of substance $n_s$ of acid or base groups, where the following relation is true:

$$0 \text{ mol} < n_N \leq n_s,$$

the acid or base groups are considered to be monovalent in this relation.

Pigments include inorganic as well as organic pigments. Examples of inorganic pigments include titanium dioxide, zinc oxide, carbon black, iron oxides, bismuth vanadates, raw and burnt sienna or umber, chromium oxide green, cadmium pigments, chromium pigments, etc. Examples of organic pigments include phthalocyanines, quinacridones, quino-phthalones, anthraquinones, isoindolines, pyranthrones, indanthrones, derivatives of dioxazine, diketopyrrolopyrroles, azo-compounds, etc. Optionally, filler pigments may be added, such as clay, silica, talc, mica, wollastonite, wood flour, and the like.

Pigment pastes may be produced from the paste resin A and at least one pigment selected from the group consisting of inorganic pigments and organic pigments. This is preferably done by mixing the paste resin A with at least one pigment, homogenising the mixture under shear to form a pigment paste, and mixing the said pigment paste with an unpigmented or white pigmented paint comprising an organic paint binder. The organic paint binder is preferably selected from the group consisting of alkyd resins, acrylic resin, acrylic modified alkyd resins, urethane alkyds, and urethane modified acrylic resins. However, also other paint binders such as polyurethane resins can be used, alone, or in mixture with one or more of those mentioned supra. The pigment paste thus produced can be used in combination with a water-borne paint or with a solvent-borne paint, and offers in all combinations coloured or tinted paints with high gloss and good colour strength.

High pigment contents can be realised in the pigment pastes according to the present invention without the use of high amounts of solvent. If organic pigments are used, the mass fraction of pigments in the pigment paste, i.e. ratio of the mass of pigments in the mixture of pigments and paste resin, and the sum of masses of pigments and paste resin, suitably ranges from 5% to 45%, preferably from 25% to 40%. If inorganic pigments are used, the mass fraction of pigments in the pigment paste should preferably be more than 10% or, more preferably, even more than 60%. If translucent pigments, e.g. translucent iron oxides, are used, the mass fraction of pigments can be more than 5%, preferably more than 20%, or even 30% or more.

If so desired, the pigment pastes according to the invention may also comprise anti-foaming agents, matting agents, anti-settling agents, anti-skinning agents, such as methyl ethyl ketoxime, and/or other suitable additives.

The invention is also directed to a method for tinting a paint by selecting a base paint from a set of base paints and subsequently mixing the base paint with one or more of the above-described pigment pastes. Although in theory it is possible to mix all colours using a single clear base paint, generally also white base paints are used in tinting systems to obtain colours with sufficient hiding power.

Different grades of white pigmented base paints may be used, if so desired.

Generally, also a limited number of pre-tinted base paints are used to enhance the scope of the miscible colours with sufficient hiding power. Separate base paints for high-gloss, or satin gloss paints may also be used, if so desired.

Pigment pastes according to the present invention are particularly useful because they can be used with a wide variety of paint binder resins, such as water-borne air drying alkyd resins, acrylic resins, and polyurethane resins, as well as solvent borne alkyd resins or acrylic resins. They lead to paints with good gloss and excellent pigment dispersion as well as colour stability, and surprisingly high tinting power.

The following examples are meant to further illustrate the invention without intending to limit to those features disclosed in the examples.

In the examples and the other parts of the specification, all amounts or contents with the unit "%" are mass fractions unless indicated otherwise. Viscosity was measured at 23° C. at a shear rate of 100 s$^{-1}$, in accordance with ISO 3219. Mass fraction of solids ("non-volatile content") was calculated in accordance with ISO 3251. Oil content is the mass fraction of oil(s) or triglycerides in the mass of the alkyd resin, with the customary unit "%". The acid value or acid number is defined as usual according to DIN EN ISO 3682 as the ratio of that mass m(KOH) of potassium hydroxide which is needed to neutralize a sample having a mass m(Sample) to the said mass m(Sample); in the case of a solution or dispersion as a sample, m(Sample) is replaced by the mass m(solids) of solid matter in the said solution or dispersion, the usual unit being "mg/g".

EXAMPLES

Example 1

Preparation of an Alkyd Resin B (Comparative)

An adduct was prepared by reacting 929 g of a monomethoxy polyethylene glycol having a molar mass of 2000 g/mol with 71 g of tetrahydrophthalic anhydride in the presence of 1 g of triethylamine as catalyst at 150° C. until a constant acid number of 26.5 mg/g was reached. After cooling to room temperature (23° C.), 644 g of this adduct were mixed with 409 g of an alkyd resin having a hydroxyl number of 70 mg/g and an acid number of less than 3 mg/g made from 160 g of sunflower oil, 72 g of benzoic acid as chain stopper, 100 g of phthalic anhydride and 100 g of pentaerythritol. Xylene was added thereto in the amount of 10% of the mass of the resin mixture, the resulting mixture was then heated to 220° C., and water formed in the reaction was completely separated by azeotropic distillation with recycle of the xylene, whereafter the remaining xylene was distilled off. The resulting product had an acid number of less than 2.5 mg/g. The dynamic viscosity of the resin was 9.5 Pa·s, measured on a 50% strength aqueous solution. This viscosity did not change during storage at 40° C. during two weeks.

Example 2

Preparation of a Basic Acrylic Copolymer Resin A1

A mixture of 270 g of dimethylaminoethyl methacrylate, 50 g of butylacrylate and 230 g of 2-ethylhexyl acrylate, and 450 g of an adduct prepared by reacting 1 mol each of hydroxyethyl methacrylate, toluylene diisocyanate and dried polyethylene glycol monomethyl ether having a number-average molar mass of 750 g/mol were added over a period of five hours to an initial charge of 330 g of isopropanol in a reaction vessel, and heated to reflux condition under stirring under a nitrogen blanket. Simultaneously, a radical initiator solution of 20 g of tert.-amyl peroctoate in 200 g of isopropanol was added. The reaction mixture was stirred for one hour after the addition was complete, and then, further 20 g of the radical initiator solution mentioned supra were added. When the reaction had ceased and the mass of residual monomer was below 0.3% of the mass of the polymer formed, the solvent was removed by distillation at approximately 110° C. under reduced pressure. The reaction vessel was then flushed with nitrogen, and the reaction mass was allowed to cool to ambient temperature (23° C.).

Example 3

Preparation of an Acidic Acrylic Copolymer Resin A2

A mixture of 60 g of acrylic acid, 40 g of isobutyl methacrylate and 70 g of isopropanol were added over a period of eight hours to an initial charge of a mixture of 123 g of isopropanol and 70 g of deionised water which were heated to reflux condition, and stirring under a nitrogen blanket. Simultaneously, a radical initiator mixture of 3 g of ammonium peroxy-disulfate and 18 g of deionised water was added. The reaction mixture was stirred for three hours after the addition was complete. The solvent was then removed by distillation at approximately 110° C. under reduced pressure until a mass fraction of solids of 70% was reached. The reaction vessel was then flushed with nitrogen, and the reaction mass was allowed to cool to 70° C. A mixture of 27 g NaOH and 100 g water was added to the resin solution under stirring to reach a pH value of 7.7. Further water was then added to adjust the mass fraction of solids to 40%.

Example 4

Preparation of a Paste Resin A113 (Comparative)

600 g of the alkyd resin of Example 1 and 400 g of the acrylic copolymer resin of example 2 were mixed after charging both resins into a resin kettle and stirring at 80° C. for one hour until a homogeneous mixture was obtained. Heating was then switched off while stirring was continued, and 1222 g of water were then added over a period of thirty minutes whereafter the kettle was allowed to cool to ambient temperature (23° C.). A semi-viscous, clear solution of the resin mixture was obtained having a mass fraction of solids of about 45%.

Example 5

Preparation of a Paste Resin A1A2

100 g of the acrylic copolymer A1 of Example 2 were charged into a resin kettle and stirred at 80° C. for one hour. Heating was then switched off while stirring was continued, and a mixture of 148 g of water and 2 g of acetic acid were added over a period of thirty minutes whereafter the kettle was allowed to cool to ambient temperature (23° C.). A semi-viscous, clear solution of the resin mixture having a mass fraction of solids of about 40% was obtained. 67.0 g of the resulting resin solution was then blended with 3.0 g of the acrylic copolymer A2 of example 3.

Example 6

Preparation of Pigment Pastes

Coloured pigment pastes were prepared from the paste resins according to the invention of Examples 4 and 5 as follows (masses of the constituents in g):

TABLE 1

Pigment Pastes according to the invention (mass of constituents in g, totalling to 100 g)

| | Pigment Paste | | | |
|---|---|---|---|---|
| | 6.1 | 6.2 | 6.3 | 6.4 |
| paste resin of Example 4 (comparative) | 44.44 | 62.30 | | |
| paste resin of Example 5 | | | 50 | 70.09 |
| defoamer (1) | 1.00 | 1.00 | 1.00 | 1.00 |
| pigment violet 23 (2) | | 22.43 | | 22.43 |
| pigment green 7 (3) | 35.00 | | 35.00 | |
| deionised water | 19.56 | 14.27 | 14.00 | 6.48 |

(1) defoamer E1 of Example 7 of WO 2011/036 039 A1
(2) ®Hostaperm violet P-RL, C.I. 51319, CAS No. 6358-30-1, Clariant International Ltd.
(3) ®Sudafast green 2727, C.I. 74260, CAS No. 1328-53-6, Sudarshan Chemical Ind. Ltd.

The pigment pastes based on Pigment Green 7 had a mass fraction of pigment in the pigment paste of 35% whereas the pigment pastes based on Pigment Violet 23 had a mass fraction of pigment in the pigment paste of 22.43%. All formulations containing the same type of pigment also contain the same amount of pigment and of paste resin also referred to as "dispersant", based on the mass of solids.

Example 7

Application Results of Tinted Paints

The pigment pastes 6.1 through 6.4 were used as tinting pastes to prepare coloured paints based on the white paints described hereunder:

White Paint A: solvent borne alkyd paint based on medium oil alkyd (soybean oil, 50% oil length, acid value 10 mg/g) with a pigment/binder ratio of 0.70/1.0 and a mass fraction of solvent (white spirits) of 33%. A standard white titanium dioxide pigment (Kronos 2190, Kronos Titan GmbH) was used.

White Paint B: solvent borne alkyd paint based on medium oil urethane modified alkyd (linseed oil, 40% oil length, acid value 14 mg/g) with a pigment/binder ratio of 0.8/1.0 and a mass fraction of solvent (mass ratio of ®Shellsol D40/®Shellsol D60=2/1) of 23%. A standard white titanium dioxide pigment (Kronos 2190, Kronos Titan GmbH) was used.

White Paint C:

395 g of a water-borne alkyd resin (®Resydrol AY 586w/38WA, an acrylic modified alkyd resin, Cytec Surface Specialties Austria GmbH), and 254 g of a white titanium dioxide pigment (®Kronos 2059, hydrophilically treated, Kronos Titan GmbH), 21.5 g of a combination siccative (®Additol VXW 4940, an emulsion of siccatives based on Co, Ba, and Zr compounds, diluted by to 50% strength with deionised water, Cytec Surface Specialties Austria GmbH), 1.45 g of a defoamer (based on liquid hydrocarbons, ®Additol VXW 6211, Cytec Surface Specialties Austria GmbH) and 5.35 g of a flow and levelling additive (®Additol XW 329, based on a polyether modified silicone, Cytec Surface Specialties Austria GmbH) were mixed and ground on a bead mill at room temperature for 30 minutes, and then let down with a mixture of a further 268 g of ®Resydrol AY 586w/38WA, 5.35 g of ®Additol XL 297 (v. s.), 24.4 g of deionised water, and 7.3 g of an 25% strength aqueous ammonia solution. The resulting white paint (approximately 1000 g) had a viscosity measured as described supra of 949 mPa·s and a pH of from 8.5 to 9.0, determined on a 10% strength dispersion in water.

The white paints were tinted with the different pigment pastes at a ratio of 1.37 g pigment paste and 150 g white paint through all paint samples.

Colour values were measured on paint films prepared from these paints with an applicator frame (BYK-Gardner PA-2056) in a wet film strength of 150 μm on a glass panel (10 cm×15 cm) and dried for twenty-four hours at room temperature (21° C.). The results are summarized in table 2. Colour values (Lab values) were measured at room temperature (23° C.) and 50% relative humidity with a BYK "Spectro-guide sphere gloss" spectrophotometer.

TABLE 2

Colour measurement of pigmented white paints (luminance L)

| | | White Paint A | White Paint B | White Paint C |
|---|---|---|---|---|
| Pigment Paste | 6.1 (green) | 91.77 | 93.51 | 91.43 |
| | 6.2 (violet) | 69.51 | 81.18 | 71.88 |
| | 6.3 (green) | 89.30 | 92.09 | 91.23 |
| | 6.4 (violet) | 68.00 | 77.85 | 70.50 |

It is clearly demonstrated by the data of Table 2 that the colour development of tinted white paints (tinting strength as measured by the value of luminance L, where a high luminance means low tinting strength) is better for the dispersant according to the invention (pigment pastes 6.3 and 6.4, lower luminance=higher tinting strength) compared to the state of the art (pigment pastes 6.1 and 6.2 according to EP 2 110 410 A1). Both in solvent based as well as in water based white paints an improvement of colour development can be observed.

The paste resin according to the invention therefore has exceptionally good compatibility with both solvent-borne and water-borne paints. It is therefore sufficient for paint formulation to prepare only one tinting paste based on the paste resin according to the invention, for use with either water-borne or solvent-borne alkyd paints and also for use with water-borne or solvent-borne acrylic paints, thereby eliminating the need to stock different pigment pastes for each of the named paint binders.

It has also been found that pigment pastes prepared with paste resins according to the invention may be used for hybrid resins based on acrylated alkyd resins, as well as for urethane alkyd and urethane acrylic resins as paint binders, and also in combination with the inorganic and organic pigment materials mentioned earlier.

The invention claimed is:

1. A paste resin A which is a mixture of at least two acrylic copolymer resins A1 and A2, wherein the acrylic copolymer resin A1 comprises at least one basic acrylic comonomer made by copolymerization of at least three classes of vinylic monomers each having at least one copolymerizable olefinic unsaturation, wherein the vinylic monomers comprise a monomer A13 which is a hydrophilic vinyl monomer having a moiety derived from polyethylene glycol or a mixed ether of ethylene and propylene glycol having a mass fraction of at least 60% of oxyethylene groups in the total mass of oxyalkylene groups, wherein one of the hydroxyl groups of the polyetherglycol is converted to an ether group, and the other hydroxyl group is consumed by esterification with (meth)acrylic acid or other olefinically unsaturated monocarboxylic acids, or by etherification with an olefinically unsaturated alcohol, or by urethane formation via reaction with an adduct of a hydroxyalkyl(meth)acrylate and a diisocyanate, wherein the acrylic copolymer resin A2 comprises at least one acidic acrylic comonomer, and wherein the acrylic copolymers A1 and A2 are mixed in a mass ratio of from 70% to 97% of A1, and from 30% to 3% of A2.

2. The paste resin A of claim 1 wherein the acrylic copolymer resin A1 comprises at least one amino group-containing vinyl type monomer A11.

3. The paste resin A of claim 1 wherein the at least one further vinylic monomer A12 which is present in the polymerisation reaction leading to the basic acrylic copolymer A1 is selected from the group consisting of linear or branched alkyl(meth)acrylates having from 1 to 13 carbon atoms in the alkyl group.

4. The paste resin A of claim 2 wherein a further vinylic monomer A14 is present in the polymerisation reaction leading to the basic acrylic copolymer A1 which monomer A14 is selected from the group consisting of styrene, any of the isomers of alkyl styrenes, vinyl naphthalene, alkyl esters of olefinically unsaturated carboxylic acids, dialkyl esters of olefinically unsaturated dicarboxylic acids, hydroxyalkyl esters of olefinically unsaturated carboxylic acids, hydroxyalkyl esters of olefinically unsaturated dicarboxylic acids, unsaturated amides and nitriles derived from such acids, alkyl vinyl ethers and alkyl vinyl ketones.

5. The paste resin A of claim 1 wherein the acrylic copolymer resin A2 is an acidic acrylic copolymer resin made by copolymerisation of at least two classes of vinylic monomers having each at least one copolymerisable olefinic unsaturation, characterised in that it comprises at least one acid functional olefinically unsaturated monomer A21.

6. The paste resin of claim 5 wherein at least one further vinylic monomer A22 is present in the polymerisation reaction leading to the acidic acrylic copolymer A2 which at least one olefinically unsaturated monomer A22 is selected from the group consisting of linear or branched alkyl(meth)acrylates having from 1 to 13 carbon atoms in the alkyl group.

7. The paste resin of claim 5 wherein at least one further vinylic monomer A23 is present in the polymerisation reaction leading to the acidic acrylic copolymer A2 which at least one olefinically unsaturated monomer A23 is selected from the group consisting of styrene, any of the isomers of alkyl styrenes, vinyl naphthalene, alkyl esters of olefinically unsaturated carboxylic acids, dialkyl esters of olefinically unsaturated dicarboxylic acids, hydroxyalkyl esters of olefinically unsaturated carboxylic acids, hydroxyalkyl esters of olefinically unsaturated dicarboxylic acids, unsaturated nitriles derived from such acids, alkyl vinyl ethers, and alkyl vinyl ketones.

8. The paste resin A of claim 1 wherein the acrylic copolymers A1 and A2 are mixed in a mass ratio of from 75% to 95% of A1, and from 25% to 5% of A2.

9. A pigment paste comprising the paste resin A of claim 1 and at least one pigment selected from the group consisting of inorganic pigments and organic pigments.

10. A method of use of the paste resin A of claim 1 comprising mixing the acrylic copolymers A1 and A2 in a mass ratio of from 70% to 97% of A1, and from 30% to 3% of A2 to form the said paste resin A, mixing the said paste resin A with at least one pigment, homogenising the mixture under shear to form a pigment paste, and mixing the said pigment paste with an unpigmented or white pigmented paint comprising an organic paint binder.

11. The method of claim 10 wherein the said paint binder is selected from the group consisting of alkyd resins, acrylic resin, acrylic modified alkyd resins, urethane alkyds, and urethane modified acrylic resins.

12. The method of claim 10 wherein the paint is a water-borne paint.

13. The method of claim 10 wherein the paint is a solvent-borne paint.

* * * * *